United States Patent [19]
Knowlton et al.
[11] Patent Number: 5,073,442
[45] Date of Patent: Dec. 17, 1991

[54] METHOD OF ENHANCING THE SOIL- AND STAIN-RESISTANCE CHARACTERISTICS OF POLYAMIDE AND WOOL FABRICS, THE FABRICS SO TREATED, AND TREATING COMPOSITIONS

[75] Inventors: Barry R. Knowlton, Bramalea; Yassin Elgarhy, St. Laurent, both of Canada

[73] Assignee: Trichromatic Carpet Inc., Quebec, Canada

[21] Appl. No.: 433,508

[22] Filed: Nov. 8, 1989

[51] Int. Cl.[5] .......................... B32B 3/02; B05D 3/02
[52] U.S. Cl. ...................................... 428/267; 106/2; 427/389; 427/393.4; 427/430.1; 427/434.2; 428/96; 428/245; 428/270; 428/311.5
[58] Field of Search ................. 427/389, 393.4, 430.1, 427/434.2; 106/8.7; 428/474.4, 96, 245, 311.5, 270, 267

[56] References Cited

U.S. PATENT DOCUMENTS

| | | | |
|---|---|---|---|
| 3,949,124 | 4/1976 | Jilla | 427/393.1 |
| 4,501,591 | 2/1985 | Ucci et al. | 8/495 |
| 4,592,940 | 1/1986 | Blyth et al. | 427/430.1 |
| 4,857,392 | 8/1989 | Kirjanov | 427/430.1 |
| 4,865,885 | 12/1989 | Herlant | 427/322 |
| 4,877,538 | 10/1989 | Kirjanov | 8/115.6 |

*Primary Examiner*—Janyce Bell
*Attorney, Agent, or Firm*—Bauer & Schaffer

[57] ABSTRACT

A method for enhancing the soil- and/or stain-resistant characteristics of polyamide and wool fabrics is provided. A variety of combinations of sulfonated resin, sulfonated phenolic compounds, compounds of sulfonated phenolics and aldehydes, fluorochemicals, modified wax emulsions, acrylics and organic acids of low molecular weight provide enhanced soil release and anti-stain properties.

14 Claims, No Drawings

METHOD OF ENHANCING THE SOIL- AND STAIN-RESISTANCE CHARACTERISTICS OF POLYAMIDE AND WOOL FABRICS, THE FABRICS SO TREATED, AND TREATING COMPOSITIONS

The object of the invention is to provide a method for enhancing the soil- and/or stain-resistant characteristics of polyamide and wool fabrics; to provide compositions useful in providing stain-resistance characteristics to treated fabrics, as well as to the treated fabrics. The fabrics may be treated during manufacture, or during cleaning or reconditioning, and may be treated in whole or in part, that is to say, the surface only of the fabric will be treated.

A particular object of the invention is to provide a method of enhancing soil- and stain-resisting properties of polyamide and wool fabrics comprising applying to the fabric a solution containing a condensation product of formaldehyde with one of the group; bis (hydroxyphenyl) sulfone: phenylsulfonic acid; dihydroxy diphenyl sulfone; benzene sulfonic acid; together with a fluorochemical plus an acrylic polymer or copolymer.

It is a particular object of the invention to provide compositions containing in a variety of combinations, sulfonated phenolic resins; sulfonated aromatic compounds; compounds of sulfonated phenolics and aldehydes; modified wax emulsions; fluorochemicals; acrylics; organic acids of low molecular weight.

Generally the treating compositions according to the invention are formulated from the following: Condensation products of aldehydes with aromatic sulfonic acids or sulfones; non-ionic and anionic water-based fluorocarbon; acrylic copolymers; modified wax emulsions; citric or Sulfamic acid; condensation products of formaldehyde with either bis (hydroxyphenyl) sulfone or phenyl sulfonic acid; fluorochemical with acrylic polymers or copolymers, for example a product sold by Dupont under the trade mark TEFLON MF; bis hydroxphenyl sulfone.

Preferred phenolic resins; fluorochemicals; acrylic resins, polymers and copolymers; as well as water-repellent materials have been selected from the following:

Phenolic Resins

Condensation products of formaldehyde with one of the following bis (hydroxyphenyl) sulfone, Phenyl sulfonic acid, 2.2 bis (hydroxyphenyl) propane, bis (hydroxyphenyl) ether di hydroxy diphenyl sulfone or benzene sulfonic acid, the foregoing being in general, novolac resins.

Fluoro Chemicals

Polyvinylidene fluoride, 2 per fluoroctyl-ethyl acrylate, poly tetra fluoro ethylene, and blends thereof with: methyl methacrylate, butyl methylacrylate, modified wax emulsions, polyvinylidene chloride, ethyl methyl acrylate.

Acrylic Resin

Methyl acrylate polymer, methyl acrylate copolymer, or blends of the foregoing two products with butyl methyl acrylate, methyl methacrylate, butyl acrylate, methyl acrylate and ethyl acrylate.

TEFLON MF

An anionic blend of fluorochemical and polyacrylic.

Modified Wax Emulsions

Paraffinic wax emulsion, microcrystaline wax emulsion, metalized wax emulsion such as aluminum salt/wax emulsion or zirconium salt/wax emulsion, modified fatty amide dispersion, anionic resinous wax emulsion such as melamine wax emulsion.

Both nylon (polyamide) fabrics and wool fabrics are susceptible to staining by both natural and artificial acid colorants of the sort found in fruit juices, non-alcoholic beverages, tea, coffee, common colorants used in household products, and so on.

Products such as water and/or oil repellents have long been used as fabric protectants to keep liquid spills from penetrating fabrics so as to prevent colorants staining the fibers. Repellents of that sort protect the fabric only as long as the spill remains suspended on the surface of the repellent coating. If the spill is dropped from a height or forced into the fabric by any means, acid colorants will stain the fabric.

Repellent and antisoil finishes may contain fluorocarbons, waxes, silicones, acrylic polymers or combinations of such products, but chemical finishes of that nature offer little or no protection against warm to hot liquids. Spills of that kind penetrate into the fibre and staining commences immediately.

Other disadvantages inherent in known repellent finishes are that they tend to wear off quickly or become contaminated with air borne and/or trafficked soil which tends to reduce their effectiveness as repellents-a particular problem in carpeted areas subject to heavy foot traffic, such as hallways and shopping mall corridors.

Products known as resist chemicals are used in the textile industry to prevent the dyeing of polyamide and wool fibers during special types of printing processes. The same type of chemical products have been used for many years to improve the wash fastness of acid dyestuff and to prevent colour bleeding. Such products include the phenolic resins which in all known processes require temperatures in excess of room temperature to bond them with the fabric, but we have found that when an aqueous solution of a condensation product of an aromatic sulfonic acid or a sulfone with an aldehyde (i.e. a phenolic resin) is applied to polyamide or wool fibers at a slightly acidic pH e.g. 6.5, and in fact at alkaline pH levels as high as 10, and allowed to dry, the resultant fibers will resist acid colorants without any heat fixation. The stain-resistant material need only penetrate into the fabric to a depth below which the staining substance would not normally be detected when viewed from the fabric surface, for example to a depth of approximately 30% of pile height.

The said condensation products are normally dark in colour and tend to discolour fabrics, particularly those fabrics that are light in colour, and furthermore, treatment with such condensation products tends to reduce the lightfastness of many acid dyestuffs used to colour both polyamide and wool fabrics and to leave a harsh hand, i.e. a hard or matted surface on the treated fabric. Such a surface on the fabric soils more readily and is more difficult to cleanse and rejuvenate.

Phenolic resins commercially available are all anionically charged and are incompatible with many nonionic surfactants and/or cationic products. When phenolic resins are mixed with nonionic surfactant products in an aqueous solution the ability of the phenolic resins to prevent acid dye staining is materially reduced within a short period of time, and when phenolic resins are mixed with cationic products in an aqueous solution immediate precipitation of the products is the result.

To achieve satisfactory resistance to acid dye colorants it is therefore necessary to reduce certain adverse effects that the condensation products we prefer happen to share with the phenolic resins, namely, poor lightfastness, discoloration of the fiber and the harsh, soil-retaining hand.

Acrylic polymers have long been used to provide both soil-release and hand-modifying characteristics in textile fabrics, as well as to provide good water repellency.

It has been found that the addition of a white acrylic polymer dispersion (anionic) to a phenolic resin greatly reduces the discoloration effect on the treated fabric, and also leaves a much softer hand in addition to providing enhanced soil-release properties. It has been discovered as well that the addition of a fluorochemical improves oil and water repellency and improves antisoiling properties.

TEFLON MF (trade mark), a carpet protection product, is an anionic blend of fluorochemical and polyacrylic resin and has been found to be compatible with both phenolic resins, according to the invention.

Laboratory tests have demonstrated that the combination of one of our aldehyde condensation products i.e. a phenolic resin, with TEFLON MF (fluorochemical plus an acrylic resin) when applied to a fabric will enhance resistance to acid colorant stains, will cause little or no change in fabric hand, will have less effect on lightfastness than straight phenolic resin, will provide antisoil properties, and will cause little or no colour change as compared to the phenolic resin by itself. In addition the product is applied at room temperature since it does not require heat fixation to bring about the improved properties.

This blended product, merchandised in association with the trade mark BARTEX, when simply diluted in water to a pH not to exceed 7 and sprayed on the polyamide or wool fabric will provide a fabric product that resists acid colorant stains, is resistant to soiling, and displays good water and oil repellency.

There is also available a product sold under the trade mark ALGUARD NS, which is a condensation product of formaldehyde with aromatic sulfonic acids which is compatible with both nonionic and anionic products and which does not lose its antistain properties when held in solution with nonionic surfactant products for prolonged periods of time. ALGUARD NS enables us to use fluorochemicals other than TEFLON MF which heretofore was to our knowledge the only anionic fluorochemical on the market compatible with a phenolic resin. Accordingly TEFLON MF was replaced with a commercially available nonionic fluorochemical. This product, identified by our trade mark BARTEX A-200, is made up as follows:

| | |
|---|---|
| Fluorochemical | 10–20% |
| Acrylic copolymer | 3.0–10% |
| Aromatic sulfonic acid condensation products | 3–10% |
| Citric Acid | to pH 5 to 6 |
| Water | Balance |

BARTEX A-200 is a concentrate to be diluted in water at a ratio of from 1:20 to 1:32, and is topically applied to fabric.

BARTEX A-200 is a fabric protectant that possesses antistain and anti-soil characteristics, and that demonstrates oil and water repellency as well. It also demonstrates good durability to wet cleaning when simply sprayed over the surface of nylon or wool fabrics and allowed to air dry. Those characteristics are imparted only to that portion of the fabric which has been contacted by the treating solution.

With some manufacturers and cleaners there is a market for a less expensive anti-stain and soil-release product that does not contain fluorochemicals, though it is not as durable as BARTEX A-200. It would be applied to nylon and wool fabrics during the cleaning process and its application would not require additional labour. This product, BARTEX SA (shampoo additive), is formulated as follows:

| | |
|---|---|
| Acrylic copolymer | 10–20% |
| Aromatic sulfonic acid/aldehyde condensation product | 5–20% |
| Citric Acid | To pH 6.5 to 7.0 |
| Water | Balance |

BARTEX SA is a concentrated product and when added to cleaning solution will impart antistain and soil-release properties to nylon and wool fabrics during the cleaning process at an application pH of 10 or lower. The product is normally applied in a range from 0.2 to 0.7% based on weight of the portion of the fibres being treated. The wide variations in application rates are due to the variations in the depth of penetration into the fabric. (e.g. 20% to 100%) Also the level of antistain and soil-release protection can vary considerably outside that range and still yield fair to excellent results. We have discovered too that it is possible to provide fabrics with antistain, antisoil and water-repellent characteristics without using either acrylic resin or fluorochemical. A typical formulation of our product BARTEX WX would be as follows:

| | |
|---|---|
| Aromatic sulfonic acid/aldehyde condensation product | 5–20% |
| Modified wax emulsion | 15–40% |
| pH | 5–6 |
| Water | Balance |

The level of antistain and antisoil protection required to yield acceptable results may also vary considerably due to the type of nylon (6 or 66), heat-set or non-heat-set or if the fabric is wool. Generally speaking nylon 6 will require 1.5 times the amount of product used for nylon 66 whereas wool can require up to twice the amount of product required for nylon 66. But where the fabrics have had antistain and antisoil treatments applied to them during manufacture they will require during subsequent treatment only small amounts of additional antistain and antisoil or soil-release to replace the original treatment products which have been removed by cleaning and normal use.

The products of the invention are in the main intended to be used to augment or supplement the anitstain, antisoil and/or soil-release properties of fabrics which have been treated in that way during manufacture, and will be accomplished for example during cleaning processes or as a separate topical sprayed finish following installation of the fabric product.

Specifically antisoil substances reduce the affinity of fabrics to soil whereas soil-release substances facilitate soil removal.

Alternatively, BARTEX SA can be applied to nylon fibres during the manufacturing process at levels of from 1% to 6% on weight of fibres and will yield excellent antistain and soil-release properties. In this case the fabric is immersed in an aqueous solution containing BARTEX SA and may or may not be subsequently oversprayed with a fluorochemical.

It is to be noted that in general colorant materials used as food additives utilize anionic dyestuffs as the substances providing the colour, and it is those substances that bond with nylon and wool fibers, either chemically or electrostatically.

The following specific examples will serve to illustrate the invention:

- Example 1—TEFLON MF vs. TEFLON MF+phenolic resin vs Untreated (Nylon 66).
- Example 2—TEFLON MF+phenolic resin vs phenolic resin (Nylon 66).
- Example 3—phenolic resin vs phenolic resin+Acrylic vs Acrylic (Nylon 66).
- Example 4—TEFLON MF vs fluorochemical+-phenolic resin vs Untreated (Nylon 6).
- Example 5—TEFLON MF+phenolic resin vs phenolic resin (Nylon 6).
- Example 6—Phenolic resin vs phenolic resin+Acrylic vs Acrylic (Nylon 6)
- Example 7—TEFLON MF+phenolic resin vs TEFLON MF vs Untreated (Wool)
- Example 8—Phenolic resin+Acrylic vs phenolic resin vs Control (Nylon 66)
- Example 9—Phenolic resin+Acrylic vs phenolic resin vs Control (Nylon 6)
- Example 10—Phenolic resin+Acrylic pH 10 vs phenolic resin+Acrylic pH 6.5 (Nylon 66)
- Example 11—TEFLON MF+phenolic resin vs Bartex A 200 (Nylon 66).
- Example 12—Modified wax emulsion+phenolic resin vs phenolic resin vs acrylic vs control (Nylon 6).
- Example 13—Modified wax emulsion+phenolic resin vs phenolic resin vs acrylic vs control (Nylon 66).

In each of the examples the fabric samples, having first been treated with antistain/soil-release solutions and dried, were exposed to a staining test. In certain examples an untreated fabric sample was used as a control.

In the examples 1 to 7, 10, 11, 12, and 13, the following staining test was used: 20 ml. a solution of sugar-sweet cherry flavoured KOOL-AID (trade mark) is poured into a 2 ¼" diameter ring placed on the carpet surface. The solution is pressed into the carpet and allowed to remain there for one hour at room temperature. The sample is rinsed under cold running water, dried and evaluated against a scale which ranges from 1 to 5 where 5 represents complete stain removal. The treated portion of the pile height only (approx. 30% of pile height) was evaluated for stain resistance.

In the examples a graduated scale from 1 to 5 was used to evaluate yellowing where 5 represents no yellowing and 4 represents acceptable yellowing.

In the examples, discoloration due to exposure to light was determined using AATCC test method with an exposure time of 40 hours. The exposed samples were graded using a graduated rating scale which ranges from 1 to 5, where 5 represents no discoloration and a rating of 4 is acceptable.

In examples 8 and 9 the following stain test was used: 20 ml. of an aqueous solution of sugar-sweet cherry flavoured KOOL-AID is poured into a 2¼" diameter ring placed on a carpet surface. The solution is pressed into the carpet and allowed to remain there for 8 hrs. at room temperature (22 degrees C.). The sample is rinsed under cold running water, dried and evaluated against a scale which ranges from 1 to 5 where 5 represents complete stain removal.

EXAMPLE 1 AND COMPARATIVE EXAMPLES A-1 AND B-1

In example 1 an aqueous solution of TEFLON MF was prepared according to manufacturer's instructions at room temperature yielding a 6.25% solution. To this solution was added 1% of a 30% by weight phenolic resin pH adjusted to 6.5. This solution was then topically sprayed onto undyed nylon 66 carpeting at the rate of 20 ml/sq.ft., brushed into the pile (approx 30% penetration of pile height) and allowed to air dry for 12 hrs. at room temperature.

In comparative example A-1, an aqueous solution of TEFLON MF was prepared according to manufacturer's instructions and at 20° C. yielding a 6.25% solution. This solution was then topically sprayed onto undyed nylon 66 carpeting at the rate of 20 ml/sq.ft, brushed into the pile (approx. 30% penetration of pile height) and allowed to air dry for 12 hrs. at room temperature (22° C.).

In comparative example B-1 the undyed nylon 66 carpet was left untreated.

Each sample was tested for initial stain resistance characteristics and stain resistance after hot water extraction cleaning using 10 gm/L. of a commercial carpet cleaning solution

TABLE 1

| EXAMPLE | STAIN RESISTANCE | AFTER CLEANING STAIN RESISTANCE |
|---|---|---|
| 1 | 5 | 4 |
| A-1 | 1 | 1 |
| B-1 | 1 | 1 |

As can be seen from the results in table 1 the treatment of the nylon 66 carpet with TEFLON MF together with a phenolic resin provides stain resistance before and after cleaning on the treated portion of the fibres and the TEFLON MF by itself offers negligible stain resistance initially and after cleaning.

EXAMPLE 2 AND COMPARATIVE EXAMPLES A-2 AND B-2

In example 2 an aqueous solution of TEFLON MF was prepared accordingly to manufacturer's instructions and at 20° C. yielding a 6.25% solution. To this solution was added 1% of a 30% weight percent phenolic resin solution, pH to 6.5. This solution was then topically sprayed onto undyed nylon 66 carpeting at the rate of 20 ml/sq.ft., brushed into the pile (approx 30% penetration of pile height) and allowed to air dry for 12 hrs. at room temperature.

In comparative example A-2, an aqueous solution of 1% phenolic resin was prepared at 20°. C. and the pH adjusted to 6.5. This solution was then topically sprayed onto undyed nylon 66 carpeting at the rate of 20 ml/sq.ft., brushed into the pile (approx. 30% penetration of pile height) and allowed to air dry for 12 hrs at room temperature (22° C.).

Each sample was tested for initial stain resistance characteristics and yellowing.

TABLE 2

| Example | Stain Resistance | Yellowing |
|---|---|---|
| 2 | 5 | 4.5 |
| A-2 | 5 | 3 |

As can be seen from the results in table 2 the treatment of the nylon 66 carpet with TEFLON MF together with a phenolic resin causes substantially less yellowing on the treated portion of the fibre than the sulfonated phenolic resin by itself, while still exhibiting excellent stain resistance. Furthermore the yellowing in example A-2 is unacceptable whereas the yellowing in example 2 is acceptable.

EXAMPLE 3 AND COMPARATIVE EXAMPLES A-3 AND B-3

In example 3 a 1.0% aqueous solution of a 30 percent by weight solution of a phenolic resin was prepared at 20° C. and the pH adjusted to 6.5. This solution was then topically sprayed onto undyed nylon 66 carpeting at the rate of 20 ml/sq.ft., brushed into the pile and allowed to air dry for 12 hrs. at room temperature.

In example A-3 a 1.0% aqueous solution of a 30 percent by weight solution of phenolic resin was prepared and to this solution was added 2% of a 25 weight percent aqueous polyacrylic solution and the pH adjusted to 6.5. This solution was then topically sprayed onto undyed nylon 66 carpeting at the rate of 20 ml/sq.ft., brushed into the pile approx 30% penetration of pile height and allowed to air dry for 12 hrs at room temperature.

In example B-3 an aqueous solution of 2% of a 25 weight percent aqueous polyacrylic solution was prepared and the pH adjusted to 6.5. This solution was then topically sprayed onto undyed nylon 66 carpeting at the rate of 20 ml/sq.ft., brushed into the pile (approx 30% penetration of pile height) and allowed to air dry for 12 hrs. at room temperature.

Each sample was tested for initial stain resistance characteristics and yellowing and stain resistance after hot water extraction cleaning using 10 gm/L. of a commercial carpet cleaning solution.

TABLE 3

| Example | Stain Resist | Stain Resist After Cleaning | Yellowing |
|---|---|---|---|
| 3 | 5 | 4 | 3 |
| A-3 | 5 | 4 | 4.5 |
| B-3 | 3 | 2 | 5 |

As can be seen from the results in table 3 the treatment of nylon 66 with phenolic resin in combination with polyacrylic yielding over-all superior results to either phenolic resin or polyacrylics by themselves. This comparison was done on the treated portion of the pile height or approximately 30% of pile height.

EXAMPLE 4 AND COMPARATIVE EXAMPLES A-4 AND B-4

In example 4 an aqueous solution of TEFLON MF was prepared according to manufacturer's instructions and at room temperature yielding a 6.5% solution. To this solution was added 1.5% of a 30% by weight phenolic resin solution, pH adjusted to 6.5. This solution was then topically sprayed onto the undyed nylon 6 carpeting at a rate of 20 ml/sq.ft., brushed into the pile (approximately 30% penetration of pile height) and allowed to air dry for 12 hrs. at room temperature.

In comparative example A-4, an aqueous solution of TEFLON MF was prepared according to manufacturer's instructions and at 20° C. yielding a 6.5% solution. This solution was then topically sprayed onto undyed nylon 6 carpeting at the rate of 20 ml/sq.ft., brushed into the pile (approximately 30% penetration of pile height) and allowed to air dry for 12 hrs. at room temperature.

In comparative example B-4 the undyed nylon 6 carpet was left untreated.

Each sample was tested for initial stain resistance characteristics and stain resistance after hot water extraction cleaning using 10 gm/L. of commercial carpet cleaning solution.

TABLE 4

| Example | Stain Resistance | After Cleaning Stain Resistance |
|---|---|---|
| 4 | 5 | 4 |
| A-4 | 1 | 1 |
| B-4 | 1 | 1 |

As can be seen from the results in table 4 the treatment of the nylon 6 carpet with TEFLON MF together with a phenolic resin provides stain resistance before and after cleaning on the treated portion of the fabric and the TEFLON MF by itself offers negligible stain resistance initially and after cleaning.

EXAMPLE 5 AND COMPARATIVE EXAMPLES A-5 AND B-5

In example 5 an aqueous solution of TEFLON MF was prepared according to manufacturer's instructions and at a 20° C. yielding a 6.25% solution. To this solution was added 1.5% of a 30% by weight phenolic resin solution pH adjusted to 6.5. This solution was then topically sprayed onto undyed nylon 6 carpeting at the rate of 20 ml/sq. ft., brushed into the pile (approximately 30% penetration of pile height) and allowed to air dry for 12 hrs. at room temperature.

In comparative example A-5, an aqueous solution of 1.5% phenolic resin was prepared at 20° C. and the pH adjusted to 6.5. This solution was then topically sprayed onto undyed nylon 6 carpeting at the rate of 20 ml/sq. ft., brushed into the pile (approximately 30% penetration of pile height) and allowed to air dry for 12 hrs. at room temperature.

Each sample was tested for initial stain resistance characteristics and yellowing.

TABLE 5

| Example | Stain Resistance | Yellowing |
|---|---|---|
| 5 | 5 | 4.5 |
| A-5 | 5 | 3 |

As can be seen from the results in table 5 the treatment of the nylon 6 carpet with TEFLON MF together with a phenolic resin caused substantially less yellowing on the treated portion of the fabric than the phenolic resin by itself, while still exhibiting excellent stain resistance. Furthermore the yellowing in example A-5 is unacceptable whereas the yellowing in example 5 is acceptable.

EXAMPLE 6 AND COMPARATIVE EXAMPLES A-6 AND B-6

In example 6 an aqueous solution of 1.5% phenolic resin solution which was 30% by weight was prepared at 20° C. and the pH adjusted to 6.5. This solution was then topically sprayed onto undyed nylon 6 carpeting at the rate of 20 ml/sq. ft., brushed into the pile (approximately 30% penetration of pile height) and allowed to air dry for 12 hrs. at room temperature.

In example A-6 an aqueous solution of 1.5% phenolic resin was prepared and to this solution was added 2% of a 25 weight percent aqueous polyacrylic solution and the pH adjusted to 6.5. This solution was then topically sprayed onto the pile, brushed in the pile (approx. 30% penetration of pile height) and allowed to air dry for 12 hrs at room temperature.

In example B-6 an aqueous solution of 2% of a 25 weight percent aqueous polyacrylic solution was prepared and the pH adjusted to 6.5. This solution was then topically sprayed onto undyed nylon 6 carpeting at the rate of 20 ml/sq. ft., brushed into the pile (approximately 30% penetration of pile height) and allowed to air dry for 12 hrs. at room temperature.

Each sample was tested for initial stain resistance characteristics and yellowing, and stain resistance after hot water extraction cleaning using 10 gm/L of a commercial carpet cleaning solution.

TABLE 6

| Example | Stain Resist | Stain Resist After Cleaning | Yellowing |
|---|---|---|---|
| 6 | 5 | 4 | 3 |
| A-6 | 5 | 4 | 4.5 |
| B-6 | 3 | 2 | 5 |

As can be seen from the results in table 6 the treatment of nylon 66 with phenolic resin in combination with polyacrylic yields superior results to either phenolic resin or polyacrylics by themselves. This comparison was made base on the treated portion of the pile height or approximately 30% pile height.

EXAMPLE 7 AND COMPARATIVE EXAMPLES A-7 AND B-7

In example 7 an aqueous solution of TEFLON MF was prepared according to manufacturer's instructions and at 20° C. yielding a 6.5% solution. To this solution was added 2% of a 30 weight percent solution of a phenolic resin solution and the pH adjusted to 6.5 with citric acid. This solution was then topically sprayed onto 100% wool carpeting at the rate of 20 ml/sq. ft. brushed into the pile (approximately 30% penetration of pile height) and allowed to air dry for 12 hrs. at room temperature.

In comparative example A-7, an aqueous solution of TEFLON MF was prepared according to manufacturer's instructions at a 20° C. yielding a 6.5% solution. This solution was then topically sprayed onto 100% wool carpeting at the rate of 20 ml/sq. ft., brushed into the pile (approx. 30% penetration of pile height) and allowed to air dry for 12 hrs. at room temperature.

In comparative example B-7 the 100% wool carpeting was left untreated.

Each example was tested for initial stain resistance characteristics and stain resistance after hot water extraction using 10 gm/L of a commercial carpet cleaning solution.

TABLE 7

| Example | Stain Resistance | After Cleaning Stain Resistance |
|---|---|---|
| 7 | 5 | 4 |
| A-7 | 1 | 1 |
| B-7 | 1 | 1 |

As can be seen from the results in table 7 the treatment of the 100% wool carpet with TEFLON MF together with a phenolic resin provides stain resistance before and after the cleaning and the TEFLON MF by itself offers negligible stain resistance initially and after cleaning.

EXAMPLE 8 AND COMPARATIVE EXAMPLES A-8, B-8 AND C-8

In example 8, into a bath containing 0.5 gm. of BARTEX SA, 300 gm. of water, and the pH adjusted to 2.3 with sulfamic acid, was placed a 20 gm. sample of undyed nylon 66 carpeting. The temperature was raised to about 85° C. and maintained for 20 minutes. The sample was rinsed and then dried at 110° C. for 15 minutes.

In comparative example A-8 into a bath containing 0.5 gm of a 30% by weight phenolic resin solution, 300 gm of water and a pH adjusted to 2.3 with sulfamic acid was placed a 20 gm sample of undyed nylon 66 carpeting. The temperature was raised to about 85° C. and maintained for 20 minutes. The sample was rinsed and then dried at 110° C. for 15 minutes.

In comparative example B-8 into a bath containing 0.5 gm of an alternative 30% by weight phenolic resin, 300 gms of water and the pH adjusted to 2.3 with sulfamic acid was placed a 20 gm sample of undyed nylon 66 carpeting. The temperature was raised to about 85° C. and maintained for 20 minutes, and then the sample was rinsed and dried at 110° C. for 15 minutes.

In comparative example C-8 into a bath containing 300 gms of water and the pH adjusted to 2.3 with sulfamic acid was placed a 20 gm sample of nylon 66 carpeting. The temperature was raised to about 85° C. and maintained for 20 minutes. The sample was rinsed and then dried at 110° C. for 15 minutes.

Each example was tested for initial stain resistance characteristics, yellowing and discoloration due to light.

TABLE 8

| Example | Stain Resistance | Yellowing | Discoloration Due to light |
|---|---|---|---|
| 8 | 4 | 5 | 4 |
| A-8 | 3-4 | 4 | 3 |
| B-8 | 4-5 | 4 | 2 |
| C-8 | 1 | 5 | 5 |

As can be seen from the test results in table 8, example 8 (acrylic polymer with phenolic resin) yields average stain resistance when compared to both of the two comparative phenolic resin samples, negligible yellowing and acceptable discoloration due to light. Conversely examples A-8 and B-8 demonstrate good stain resistance but only acceptable yellowing and only unacceptable discoloration due to light.

EXAMPLE 9 AND COMPARATIVE EXAMPLES A-9, B-9 AND C-9

In example 9, into a bath containing 0.9 gm of BARTEX SA, 300 gm of water and the pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example A-9 into a bath containing 0.9 gm of a 30% by weight phenolic resin, 300 gm of water and pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example B-9 into a bath containing 0.5 gm of an alternate 30% weight phenolic resin, 300 gm of water and the pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example C-9 into a bath containing 300 gms of water and the pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

Each example was tested for initial stain resistance characteristics, yellowing and discoloration due to light.

TABLE 9

| Example | Stain resistance | Yellowing | Discoloration Due to light |
|---|---|---|---|
| 9 | 4 | 4-5 | 4 |
| A-9 | 3 | 4 | 3 |
| B-9 | 4 | 3 | 2 |
| C-9 | 1 | 5 | 5 |

As can be seen from the test results in table 9, example 9 (acrylic polymer with phenolic resin) yields above average stain resistance when compared to both of the two comparative phenolic resin samples, negligible yellowing and acceptable discoloration to light. Conversely example A-9 and B-9 demonstrate marginal stain resistance and unacceptable discoloration due to light and marginal to unacceptable yellowing.

EXAMPLE 10 AND COMPARATIVE EXAMPLE A-10

In example 10, a 1.0% aqueous solution of a 30% by weight phenolic resin solution was prepared and to this solution was added 2% of a 25 weight percent aqueous polyacrylic solution, 0.1% of a commercial carpet cleaning solution and the pH adjusted to 10. This solution was then sprayed onto the pile of undyed nylon 66 carpeting, at the rate of 10 ml/sq. ft. brushed into the pile (approximately 30% penetration of pile height) and allowed to air dry for 12 hrs. at room temperature.

In comparative example A-10, a 1.0% aqueous solution of a 30% by weight phenolic resin was prepared and to this solution was added 2% of a 25 weight percent aqueous polyacrylic solution, 0.1% of a commercial carpet cleaning solution and the pH adjusted to 10. This solution was then sprayed onto the pile of undyed nylon 66 carpeting at the rate of 10 ml/sq. ft., brushed into the pile (approximately 30% penetration of pile height) and allowed to air dry for 12 hrs. at room temperature.

Each example was tested for initial stain resistance characteristics and stain resistance after hot water extraction cleaning using 10 gm/L of commercial carpet cleaning solution.

TABLE 10

| Example | Stain Resist | Stain Resist After Cleaning |
|---|---|---|
| 10 | 4-5 | 3-4 |
| A-10 | 5 | 4 |

As can be seen from the results in table 10 the treatment of nylon 66 carpeting at a pH level of 10 shows only slightly inferior stain resistance to A-10 treated at a pH level of 6.5. The presence of a carpet cleaning solution had no effect on the antistain characteristics.

EXAMPLE 11 AND COMPARATIVE EXAMPLE A-11

In example 11 an aqueous solution of TEFLON MF, was prepared according to manufacturer's instructions at room temperature yielding a 6.25% solution. To this solution was added 1% of a 30% by weight phenolic resin solution, Ph adjusted to 6.5. This solution was then topically sprayed onto undyed nylon 66 carpeting at the rate of 20 ml/sq. ft., brushed into the pile (approximately 30% penetration of pile height) and allowed to air dry at room temperature for 12 hrs.

In comparative example A-11 a 1.5% aqueous solution of BARTEX A200 was prepared at room temperature with a resultant pH of 6.5. This solution was then topically sprayed onto undyed nylon 66 carpeting at the rate of 20 ml/sq. ft., brushed into the pile (approximately 30% penetration of pile height) and allowed to air dry at room temperature for 12 hrs.

Each sample was tested for initial stain resistance characteristics, stain resistance after hot water extraction cleaning using 10 gm/L of a commercial carpet cleaning solution, yellowing and discoloration due to light.

TABLE 11

| Example | Stain Resistance | After Cleaning stain resistance | Yellowing | Discoloration due to light |
|---|---|---|---|---|
| 11 | 5 | 4 | 4.5 | 4 |
| A-11 | 5 | 4.5 | 4.5 | 4.5 |

As can be seen from the results in table 11 the treatment of nylon 66 carpeting with either of the antistain combinations yields excellent results in all tests.

EXAMPLE 12 AND COMPARATIVE EXAMPLES A-12, B-12 AND C-12

In example 12, into a bath containing 0.9 gm of Bartex WX, 300 gm of water and pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example A-12 into a bath containing 0.9 gm of a 30% by weight phenolic resin, 300 gm of water an pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example B-12 into a bath containing 2% of a 25% weight acrylic resin, 300 gm of water and pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

In comparative example C-12 into a bath containing 300 gm of water and the pH adjusted to 2.3 with sulfamic acid was placed a 20 gm sample of undyed nylon 6 carpeting. The temperature was raised to 85° C. and maintained for 20 minutes. The sample was rinsed and then dried at 110° C. for 15 minutes.

Each example was tested for initial stain resistance characteristics, yellowing and discoloration due to light.

TABLE 12

| Example | Stain Resistance | Yellowing | Discoloration Due to Light |
|---|---|---|---|
| 12 | 5 | 5 | 5 |
| A-12 | 4 | 4 | 3 |
| B-12 | 3 | 4-5 | 5 |
| C-12 | 1 | 5 | 5 |

As can be seen form the test results in table 12, example 12 Bartex WX (wax emulsion and phenolic resin) yields excellent stain resistance when compared to phenolic resin alone or acrylic resin alone.

Conversely example A-12 demonstrates acceptable stain resistance and yellowing, and unacceptable discoloration due to light.

Example B-12 demonstrates unacceptable stain resistance, acceptable yellowing, and discoloration due to light.

It is clearly evident that example 12 shows that Bartex WX, is superior to all other examples.

EXAMPLE 13 AND COMPARATIVE EXAMPLES A-13, B-13 AND C-13

In example 13, into a bath containing 0.9 gm of Bartex WX, 300 gm of water and pH adjusted to 2.3 with sulfamic acid was placed a 20 gm sample of undyed nylon 66 carpeting. The temperature was raised to 85° C. and maintained for 20 minutes. The sample was rinsed and then dried at 110° C. for 15 minutes.

In comparative example A-13 into a bath containing 0.9 gm of a 30% by weight phenolic resin, 300 gm of water an pH adjusted to 2.3 with sulfamic acid was placed a 20 gm sample of undyed nylon 66 carpeting. The temperature was raised to 85° C. and maintained for 20 minutes. The sample was rinsed and then dried at 110° C. for 15 minutes.

In comparative example B-13 into a bath containing 2% of a 25% weight acrylic resin, 300 gm of water and pH adjusted to 2.3 with sulfamic acid was placed a 20 gm sample of undyed nylon 66 carpeting. The temperature was raised to 85° C. and maintained for 20 minutes. The sample was rinsed and then dried at 110° C. for 15 minutes.

In comparative example C-13 into a bath containing 300 gm of water and the pH adjusted to 2.3 with sulfamic acid was placed a 20 gm sample of undyed nylon 66 carpeting. The temperature was raised to 85° C. and maintained for 20 minutes. The sample was rinsed and then dried at 110° C. for 15 minutes.

Each example was tested for initial stain resistance characteristics, yellowing and discoloration due to light.

TABLE 13

| Example | Stain Resistance | Yellowing | Discoloration Due to Light |
|---|---|---|---|
| 13 | 5 | 5 | 5 |
| A-13 | 4 | 4 | 3 |
| B-13 | 3 | 4-5 | 5 |
| C-13 | 1 | 5 | 5 |

As can be seen form the test results in table 13, example 13 Bartex WX (wax emulsion and phenolic resin) yields excellent stain resistance when compared to phenolic resin alone or acrylic resin alone.

Conversely example A-13 demonstrates acceptable stain resistance and yellowing, and unacceptable discoloration due to light.

Example B-13 demonstrates unacceptable stain resistance, acceptable yellowing, and discoloration due to light.

It is clearly evident that example 13 shows that Bartex WX, is superior to all other examples.

The foregoing is by way of example only and the invention should be limited only by the scope of the appended claims.

The embodiments of the invention in which an exclusive property or privilege is claimed are defined as follows:

1. The method of enhancing soil- and stain-resisting properties of polyamide and wool fabrics comprising applying to the fabric an aqueous solution containing the condensation product of formaldehyde with a compound selected from the group consisting of bis(hydroxyphenyl) sulfone, phenylsulfonic acid, dihydroxy diphenyl sulfone, and benzene sulfonic acid; and at least one material selected from the group consisting of a wax emulsion and a fluorochemical; and a polymer selected from the consisting of acrylic polymer and copolymer.

2. The method according to claim 1, wherein the solution is an aqueous solution having a pH not exceeding 10.

3. The method according to claim 1 where the solution is an aqueous solution having a pH below 7 applied to the fabric by spraying at room temperature and in the absence of any heat fixation.

4. The method according to claim 1 wherein the condensation product is a polymer of benzene sulfonic acid and formaldehyde, the fluorochemical is a nonionic or anionic water based fluorochemical, the acrylic polymer is polymerized 2-methyl propenoic acid ethyl ester, and wherein the solution contains citric acid in an amount sufficient to provide a pH below 7.

5. The method according to claim 1 where the fluorochemical is present in the solution in an amount of between 0.1 percent and 20 percent.

6. The method according to claim 5 where the solution contains 0.1 percent fluorochemical.

7. An aqueous solution for enhancing the soil- and stain-resistant properties of polyamide and wool fabrics comprising in admixture a condensation product of an aromatic sulfonic acid and formaldehyde together with wax emulsion, a nonionic water based fluorochemical, and an acrylic polymer, said admixture having a pH below 10.

8. The aqueous solution according to claim 7 wherein the pH is below 7.

9. A fibrous material selected from the group consisting of polyamide and wool fibrous materials having applied thereto an aqueous solution containing a polymer of a phenolic compound selected from the group consisting of bis(hydroxyphenyl) sulfone, phenylsulfonic acid, dihydroxy diphenyl sulfone and benzene sulfonic acid with an aldehyde; a fluorochemical and an acrylic polymer together with citric acid in an amount sufficient to provide a pH below 7.

10. The method of enhancing the soil-and stain-resistance of polyamide fabric by immersing or totally wetting out said fabric with an aqueous solution containing a polymer of a phenolic compound selected from the group consisting of bis(hydroxyphenyl) sulfone, phenylsulfonic acid, dihydroxy diphenyl sulfone and benzene sulfonic acid with an aldehyde; a fluorochemical and an acrylic polymer; said solution having a pH below 7.

11. The method according to claim 10 where the fabric is subsequently sprayed with a fluorochemical water and oil repellent.

12. The method according to claim 10 where the fabric is subsequently sprayed with a fluorochemical water and oil repellent which also contains an acrylic polymer or copolymer and a phenolic resin.

13. The method of enhancing the soil- and stain-resistant properties of polyamide and wool fabrics comprising applying to the fabric an aqueous solution containing the condensation product of formaldehyde with a phenolic compound selected from the group consisting of bis(hydroxy phenyl) sulfone, phenylsulfonic acid, dihydroxy diphenyl sulfone, and benzene sulfonic acid; and at least one material selected from the group consisting of a wax emulsion and an acrylic polymer; said aqueous solution having a pH below 10.

14. The method of enhancing the soil- and stain-resistant properties of polyamide and wool fabrics comprising applying to the fabric an aqueous solution containing the condensation product of formaldehyde with a phenolic compound selected from the group consisting of bis(hydroxyphenyl) sulfone, phenylsulfonic acid, dihydroxy diphenyl sulfone, and benzene sulfonic acid, and a wax emulsion; said aqueous solution having a pH below 10.

* * * * *